L. J. STEPHENSON.
MOTOR VEHICLE.
APPLICATION FILED JUNE 10, 1919.
1,323,500.
Patented Dec. 2, 1919.
3 SHEETS—SHEET 1.
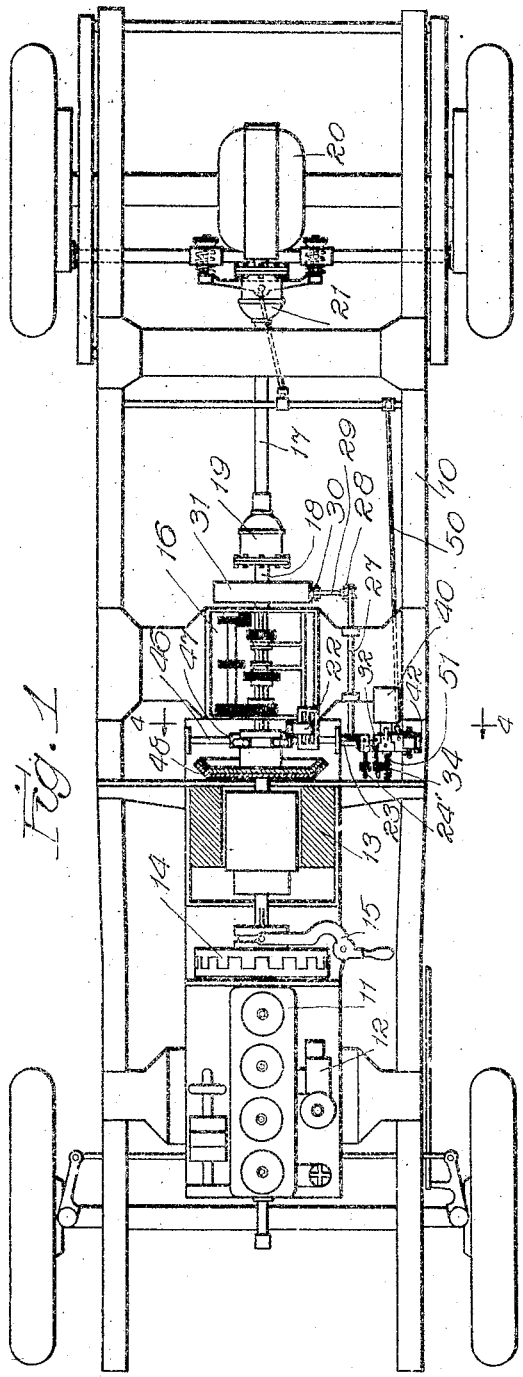
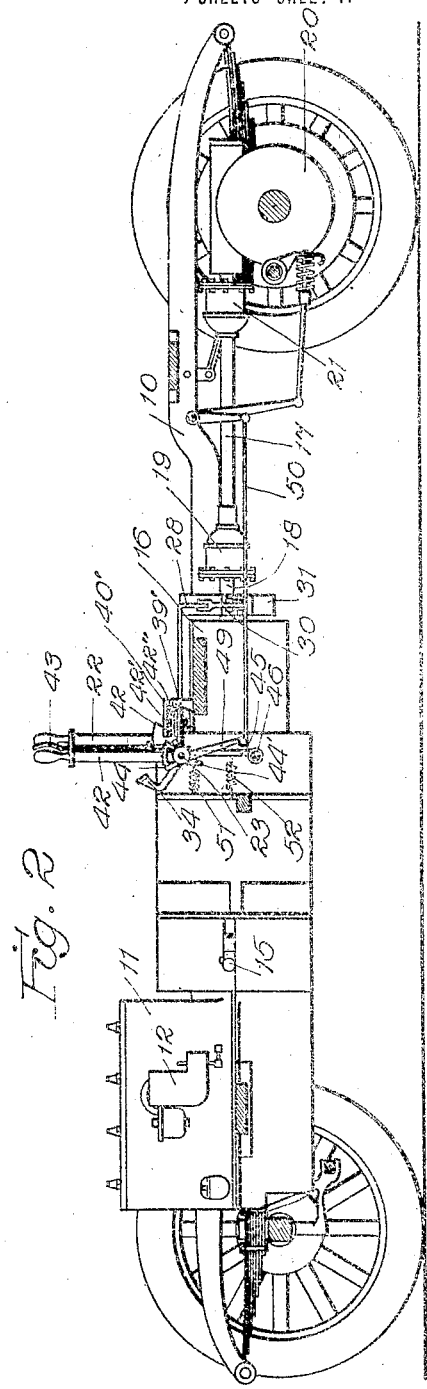

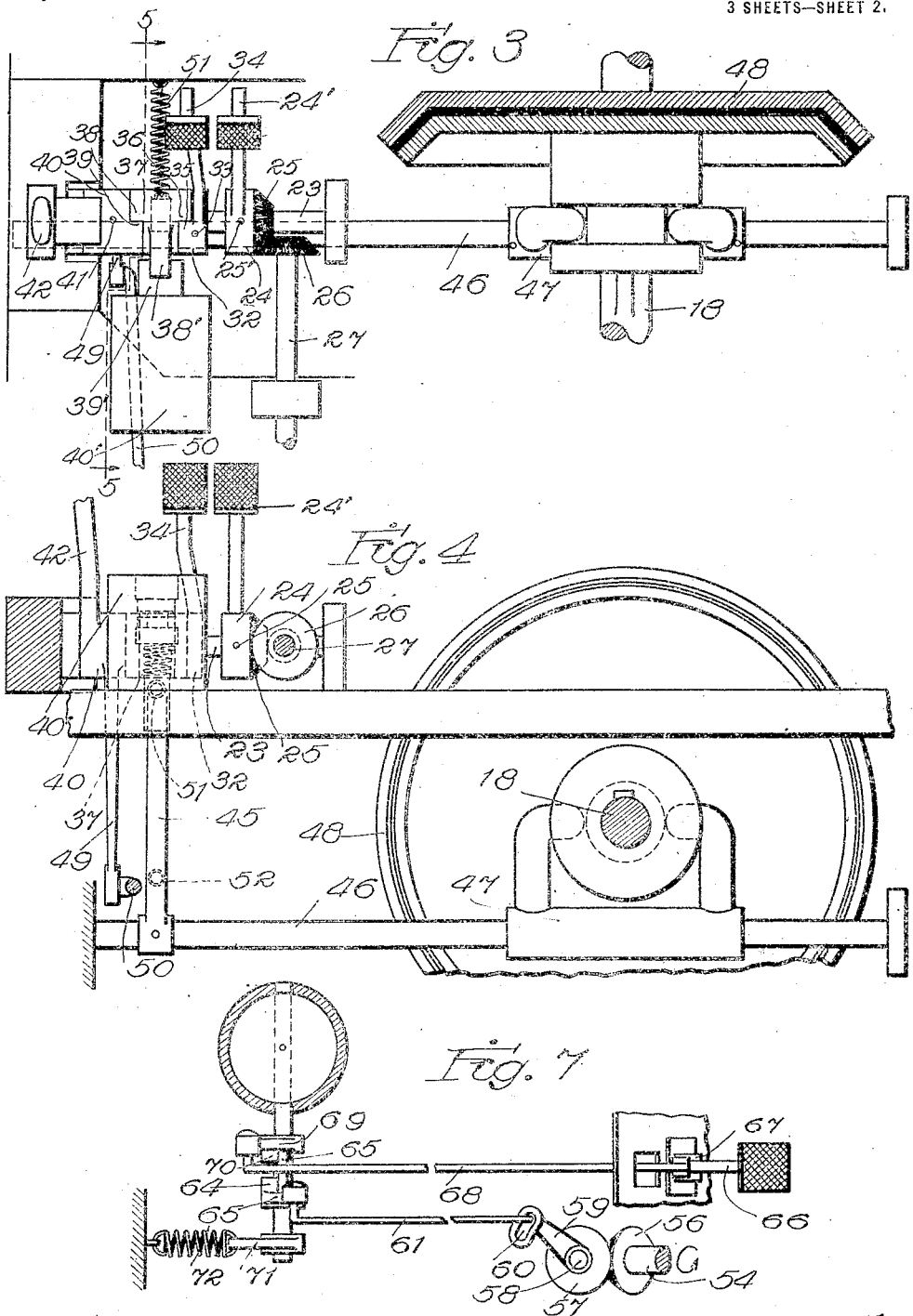

L. J. STEPHENSON.
MOTOR VEHICLE.
APPLICATION FILED JUNE 10, 1918.
1,328,500.
Patented Dec. 2, 1919.
3 SHEETS—SHEET 3.
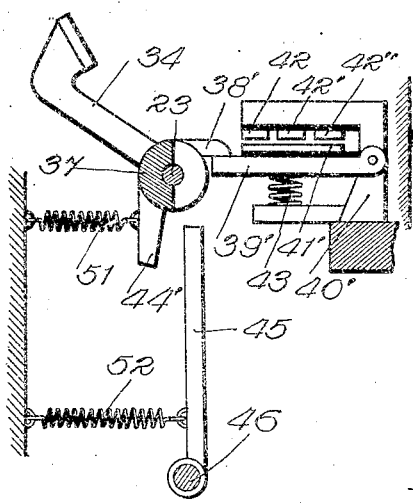
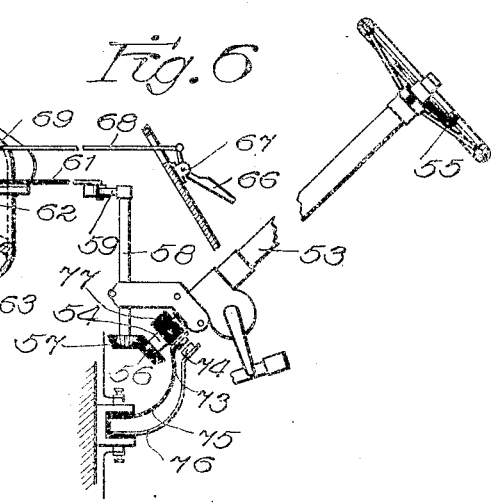
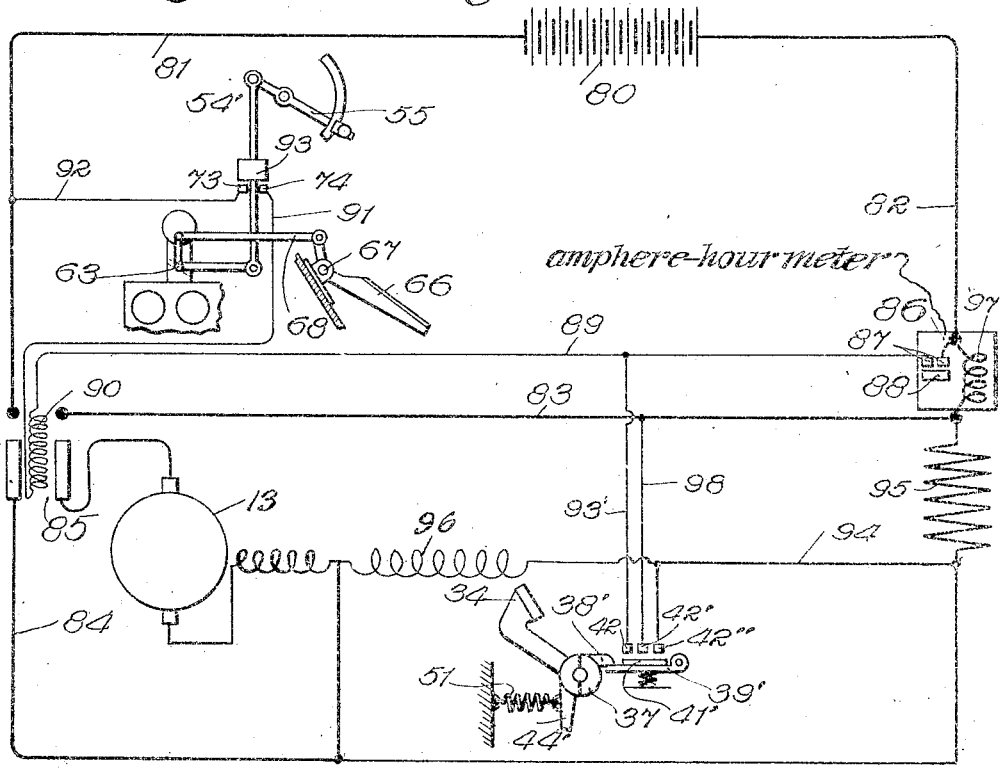

UNITED STATES PATENT OFFICE.

LEIGH J. STEPHENSON, OF CHICAGO, ILLINOIS, ASSIGNOR TO WOODS MOTOR VEHICLE COMPANY, OF CHICAGO, ILLINOIS, A CORPORATION OF ILLINOIS.

MOTOR-VEHICLE.

1,323,700.   Specification of Letters Patent.   Patented Dec. 2, 1919.

Application filed June 10, 1918. Serial No. 239,284.

*To all whom it may concern:*

Be it known that I, LEIGH J. STEPHENSON, a citizen of the United States, residing at Chicago, in the county of Cook and State of Illinois, have invented a certain new and useful Improvement in Motor-Vehicles, of which the following is a full, clear, concise, and exact description, reference being had to the accompanying drawings, forming a part of this specification.

My invention relates to improvements in motor vehicles and is especially concerned with improvements in vehicles of this type in which a dual power plant comprising a suitable engine and a dynamo is employed for driving the vehicle. In power plants of this type a storage battery is used in connection with the dynamo and is so connected as to receive power from the dynamo or to deliver power thereto, depending upon the speed of the engine.

The objects of my invention are:

1st. To simplify the controlling means for dual power plants of the type referred to and to increase the efficiency thereof.

2nd. To provide novel means for regulating the charging of the storage battery and for connecting the storage battery with the dynamo when the dynamo is to serve as a motor.

3rd. To provide novel means for producing a dynamical braking effect upon the vehicle.

4th. To provide braking mechanism coacting with the dynamical braking means for bringing the vehicle to a complete stop.

5th. To provide novel means for reversing the direction of travel of the vehicle.

6th. To provide novel means for controlling the speed of a vehicle provided with a power plant of the type referred to.

Further objects, adaptabilities, and capabilities will appear as the description progresses, reference being had to the accompanying drawings, in which, Figure 1 is a plan view of an automobile chassis, the body being removed and certain portions being broken away for the purpose of better illustration;

Fig. 2 is a longitudinal section;

Fig. 3 is an enlarged fragmentary view showing the mechanism for controlling the clutch and the service and emergency brakes, and also showing a switching mechanism the construction and details of which will later be described;

Fig. 4 is a transverse section taken on the line 4—4 of Fig. 1 and showing further details of the construction shown in Fig. 3;

Fig. 5 is an enlarged sectional detail view taken on the line 5—5 of Fig. 3;

Fig. 6 is a side elevation showing the details of the mechanism for controlling the throttle of the internal combustion engine, and also showing the switch for closing the circuit of the solenoid operated main switch, as will be described later on;

Fig. 7 is a plan view of the mechanism shown in Fig. 6, certain portions of this mechanism being broken away; and Fig. 8 is a diagrammatic view showing the connection between the dynamo and storage battery in combination with the control mechanism.

The sectional views are taken looking in the direction of the small arrows, and in the several figures the same reference characters refer to similar parts.

In the preferred embodiment of my invention I provide an internal combustion engine which has a driving connection with a compound wound dynamo. The compounding of this dynamo is such that it operates cumulatively when the dynamo is operated as a motor and differentially when the dynamo is operated as a generator. During normal operation a resistance is connected in series with the shunt winding of the dynamo, but when it is desired to use the dynamical braking effect of the dynamo to reduce the speed of the vehicle this resistance is short circuited in order to increase the strength of the field and thereby increase the dynamical braking effect. The dynamo is connected with the storage battery by a circuit which includes a solenoid operated switch and a switch or relay operated by an ampere hour meter. The solenoid of the solenoid operated main switch is connected in series with the switch controlled by the ampere hour meter in such a manner that the main switch is opened after the battery has received a predetermined amount of charging current and closed when this predetermined amount of current has been discharged in the opposite direction. In this manner the battery is maintained in its properly charged condition. I also provide means for short-circuiting the contacts of the ampere-hour meter switch so that the main switch can be closed to start the vehicle in case the battery has become completely charged while the vehicle is standing still.

In my improved vehicle I provide both a throttle lever and an accelerator pedal for controlling the throttle of the internal combustion engine. Connected with the throttle lever is a switch mechanism which closes the circuit of the solenoid of the main switch upon the initial movement of the throttle lever. Further movement of the throttle lever opens the throttle and permits the engine to speed up. I prefer that the connection between the throttle lever, the throttle, and the switch last referred to shall be such that the throttle is opened to a degree permitting the engine to operate at a speed slightly greater than idling speed before the switch is closed. This speed should be sufficient to cause the battery to charge at a comparatively low rate in the case that it is not already completely charged. When the vehicle is then started the speed of the engine will drop to a point where the current will reverse its direction of flow and cause the generator to function as a motor, thereby assisting the engine to start the vehicle. After the vehicle is once started the speed thereof is controlled by opening and closing the throttle through the instrumentality of the accelerator pedal.

I provide both a service and an emergency brake mechanism. The drum of the service brake is mounted upon the transmission shaft and is controlled by a suitable brake pedal. I also provide a clutch pedal for disengaging the surfaces of the friction clutch which I employ between the dynamo and the transmission, and this clutch pedal also controls two circuits, one of which short-circuits the contact of the ampere-hour meter switch for the purpose described above, and the other of which short-circuits the shunt field resistance. The emergency brake drums are secured to the rear wheels in the same manner as the service brakes of an ordinary motor driven vehicle and the operating lever for the emergency brakes is also adapted to actuate the switching mechanism for short-circuiting the ampere hour meter contacts and the resistance of the shunt field. After either the clutch pedal or the emergency brake lever has been moved to the position where it closes the switch above referred to further movement of either the clutch pedal or the emergency brake lever will disconnect the clutch.

Referring to the drawings, the reference character 10 indicates the chassis of a motor driven vehicle which, so far as my invention is concerned, may be of any type and is merely conventionally illustrated. At 11 I have illustrated an internal combustion engine provided with a carbureter 12. The reference character 13 indicates a compound wound dynamo so constructed as to function cumulatively when operating as a motor and differentially when operating as a generator. This dynamo is driven from the internal combustion engine through an ordinary toothed clutch 14 which can be engaged and disengaged by means of a hand lever 15 positioned beneath the engine hood. I provide this clutch mechanism so that it may be possible to completely disengage the engine from the dynamo and drive the vehicle solely by the dynamo acting as a motor in case the engine should become completely disabled. At the rear of the dynamo 13 is a transmission which is indicated in general by the reference character 16. This transmission should be of the forward and reverse type, and although I have illustrated a transmission which furnishes two speeds forward and one in reverse it is to be understood that this transmission can be of any desired type as long as it includes the forward and reverse feature. The reference character 17 indicates the propeller shaft which is connected with the driven shaft 18 of the transmission by a universal joint 19 and connected with the differential 20 by means of a second universal joint 21. The reference character 22 indicates the gear shift lever of the transmission.

Rotatably mounted upon the shaft 23 is a collar 24 which has formed integrally therewith a beveled gear 25, and to which is secured the service brake pedal 24'. The collar 24 is prevented from longitudinal movement relative to the shaft 23 by means of a screw 25' which slidably engages an annular groove in the shaft 23 in a manner well understood. The beveled gear 25 meshes with a second beveled gear 26 on the shaft 27. At its rear end the shaft 27 is provided with a downwardly extending arm 28 which is connected by means of a link 29 with a lever 30 of the service brake band 31. This service brake band co-acts with a brake drum on the driven shaft 18 of the transmission. A second collar 32 is rotatably mounted upon the shaft 23 and prevented from longitudinal movement thereon by a screw 33, and has formed integrally therewith the clutch pedal 34. The collar 32 is provided with a shoulder 35 which co-acts with a similar shoulder 36 upon a sleeve 37 which is also rotatably mounted upon the shaft 23. The sleeve 37 is provided with a second shoulder 38 at its opposite end which co-acts with the shoulder 39 of the sleeve 40. The sleeve 40 is rotatably mounted upon the shaft 23 and prevented from longitudinal movement relative thereto by the screw 41. Formed integrally with the sleeve 40 is an emergency brake lever 42. This brake lever, as shown in Fig. 2, is provided with a detent mechanism 43 which co-acts with a quadrant 44 to hold the emergency brake lever in any of its adjusted positions. From the above description it will be apparent that when either the clutch pedal 34 or the emergency brake lever 42 is pushed forwardly the sleeve 37 will be rotated about the shaft 23. The sleeve 37, as shown in Fig. 5, is provided with a rearwardly extending lug 38' which engages the top surface of the pivoted blade 39' of the three pole switch 40'. The blade 39' carries an insulated contact 41' which co-acts with the three insulated contacts 42, 42', and 42'', to complete certain circuits which will be described in detail later on. A compression spring 43 moves the contact 41' into contact with the contacts 42, 42', and 42'' when the pedal 34 is depressed.

The sleeve 37 is also provided with a downwardly depending lug 44' which is adapted to engage with the arm 45 on the rock shaft 46 after the contacts of the switch 40' have been closed due to the movement of the lug 38'. The shaft 46 is provided at 47 with a clutch shifting yoke, the details of which it is believed it is unnecessary to describe. When the clutch pedal 34 is pushed forwardly or depressed the lug 38' first releases the blade 39' of the switch 40', thereby permitting the contacts of this switch to close and the lug 44' then engages the arm 45 and causes the slidable member of the friction clutch 48 to be disengaged from its co-acting member, thereby disconnecting the power plant from the transmission and the propeller shaft. From the above description it will be clear that either the pedal 34 or the emergency brake lever 42 may be used independently of each other for disengaging the clutch 48 and for closing the switch 40'.

The emergency brake lever 42 is provided at its lower end with an arm 49 which actuates the link 50 to control the emergency brakes which are associated with the rear driving wheels. The details of this braking mechanism are well known and it is, therefore, believed to be unnecessary to describe it more in detail. It is sufficient for the purposes of this invention that the emergency brakes be set when the lever 42 is moved forwardly. A spring 51 serves to hold the clutch pedal 34 in its up position and a spring 52 holds the slidable member of the friction clutch in engagement with its co-acting member. In this connection it is to be understood that the transmission has a neutral position in order that the power plant may be disconnected from the propeller shaft when starting the engine or when it is desired to charge the storage battery while the motor vehicle is not running.

In Figs. 6 and 7 I have shown certain details of the mechanism for controlling the engine throttle and for closing the switch to energize the solenoid of the main switch. In these figures the reference character 53 indicates the steering column through the center of which extends the shaft 54. At its upper end this shaft is provided with a throttle lever 55 whereby the shaft may be rotated and at its lower end it is provided with a beveled gear 56 co-acting with a similar beveled gear 57 upon a shaft 58. The upper end of the shaft 58 is provided with an arm 59 having a small slot 60 at its free end. A link 61 is provided at its rear end with a down turned portion which is received in the slot 60 and at its forward end connects with the arm 62 which is rotatably mounted upon the throttle shaft 63. Formed integrally with the arm 62 is a lug 64 which when the lever 62 rotates in a clockwise direction engages the elongated lug 65 on the throttle shaft to open the throttle. I also provide an accelerator pedal 66 for actuating the throttle valve independently of the throttle lever. This pedal is pivoted to the dash, as indicated at 67, or to any other suitable support, and is connected by means of a link 68 with an arm 69 rotatably mounted upon the throttle valve shaft 63. The arm 69 is provided with a lug 70 which is also adapted to engage the elongated lug 65 when the arm 69 is rotated in a clockwise direction. The shaft 63 is provided with an arm 71 which is actuated by a spring 72 to rotate the valve shaft 63 in a counter clockwise direction, thereby causing the lug 65 to always engage that one of the lugs 64 or 67 which is in the most advanced position. This mechanism for independently operating the throttle valve by either the throttle lever or the accelerator pedal is old and well known and further description appears to be unnecessary. It should be noted, however, that adjacent the lower end of the steering column I provide a pair of contacts 73 and 74 which are carried by the insulated spring arms 75 and 76 respectively. I also provide an eccentric 77, which is preferably formed of insulated material, and which bears against the adjacent side of the spring arm 75. Upon the initial rotation of the throttle lever 55 the contacts 73 and 74 are closed for a purpose which will be described later on. The continued rotation of the throttle lever 55 causes the arm 62 to open the throttle. As stated above, in the operation of my improved motor vehicle I prefer to advance the throttle lever 55 to the position where the engine rotates at a speed slightly greater than idling speed. Thereafter during the operation of the vehicle the speed is increased and decreased by operating the accelerator pedal 66. The lost motion connection between the arm 59 and the link 61 described above permits the closing of the switch contacts 73 and 74 before the opening of the throttle begins.

Having described the mechanical details of my improved dual power plant I will now describe the circuits connecting the dynamo and the storage battery and the relation of the various control means referred to above.

Referring to Fig. 8, the reference character 80 indicates the storage battery. This storage battery is connected in series with the dynamo 13 by the conductors 81, 82, 83, and 84. This circuit includes a solenoid operated main switch, indicated generally by the reference character 85, and an ampere hour meter switch or relay indicated in general by the reference character 86. As stated above the ampere hour meter switch 86 operates to close the contacts 87 and 88 when a certain amount of current has discharged from the battery 80 and to open these contacts when the battery has been charged with the same amount of current flowing from the dynamo. Switches of this type are well known and it is thought unnecessary to herein describe the details thereof. One of the contacts 87 is connected by means of a conductor 89 with the solenoid 90 of the main switch and the other terminal of the solenoid is connected with the opposite side of the battery by means of the conductors 91 and 92 and the contacts 73 and 74. To simplify the diagram I have illustrated the contacts 73 and 74 as being closed by a contact 93 carried by the reciprocating throttle shaft 54' instead of by an eccentric carried by a rotating throttle shaft 54, as shown in Fig. 6. It is, of course, immaterial what means are employed for causing this circuit to be closed through the movement of the throttle lever 55. From the above description it will be apparent that when the throttle lever 55 is moved to close the contacts 73 and 74 and to subsequently open the throttle the solenoid 90 will first be energized and cause the main switch 85 to close, this statement being made on the assumption that the contacts 87 and 88 are closed, thereby indicating that the battery 80 is not completely charged. If the battery 80 should, however, be completely charged movement of the throttle lever 55, while closing the contacts 73 and 74, cannot complete the circuit through the solenoid 90 and it would, therefore, be impossible to start the vehicle unless some means are provided for energizing the solenoid 90 independently of the ampere hour meter. To do this I provide a short-circuiting circuit which comprises the conductor 93' and the contacts 42, 41', 42' and conductor 98. When the pedal 34 is depressed and the throttle lever 55 is moved to close the contacts 73 and 74 current will flow from the storage battery through the conductors 81 and 92, the contacts 73 and 74, conductor 91, solenoid 90, conductors 89 and 93, contacts 42, 41' and 42', conductors 98 and 83, winding 97 of the ampere hour meter, and conductor 82 back to the battery 80, thereby energizing the solenoid 90. The generator will then act as a motor to crank the engine. The throttle valve 55 will then be advanced sufficiently to cause the engine to rotate at a speed slightly greater than idling speed, thereby causing the dynamo to function as a generator and start to charge the storage battery. When the lever 22 of the transmission is then thrown out of neutral into either the reverse or the forward position and the pedal 34 allowed to come back, engaging the clutch, the load imposed upon the engine will cause it to slow down to a speed at which the dynamo will function as a motor and assist the engine to start the vehicle. The further control of the speed of the vehicle is thereafter obtained by operation of the accelerator pedal.

When the vehicle is traveling and it is desired to reduce the speed, it is merely necessary to depress the pedal 34, whereupon the resistance 95 in series with the shunt field will be short-circuited by the conductors 94 and 98 and the contacts 42', 41' and 42''. At the same time the accelerator pedal will, of course, be moved to the position to close the throttle. Through these two operations the driving power of the engine will be reduced, thereby throwing the load upon the generator and in case the generator is charging the battery the increase in field strength due to the short-circuiting of the resistance 95 will produce an increased dynamical braking effect. If it is desired to coast the pedal 34 will be depressed to the point where it disengages the slidable member of the friction clutch from its co-acting member. If it is desired to charge the batteries while the vehicle is stationary the throttle is set at a position to give the desired speed to the dynamo and the emergency brake is thrown forward and locked, thereby disengaging the transmission from the dynamo.

While I have not disclosed any ignition system for my internal combustion engine it is to be understood that any desired system of ignition can be used, but I prefer to use one in which the spark is automatically retarded and advanced.

While I have described the details of the preferred embodiment of my invention it is to be understood that these details may be varied within the scope of the appended claims.

Having thus described my invention what I claim as new and desire to secure by Letters Patent of the United States is:

1. A motor driven vehicle comprising an internal combustion engine provided with a throttle, a throttle lever and an accelerator pedal for independently actuating said throttle, a compound wound dynamo, driving connections between said dynamo and said internal combustion engine comprising a clutch, a multi-speed forward and reverse gear transmission connected with said dynamo by a second clutch, a propeller shaft driven from said transmission, a service brake, an emergency brake, a storage battery, a circuit for connecting said dynamo and storage battery comprising a solenoid operated main switch and an ampere hour meter, an energizing circuit for the solenoid of said main switch, contacts controlled by said ampere hour meter to open and close said energizing circuit when said battery is discharged or charged respectively, a switch connected with said throttle lever to close said energizing circuit before the throttle is opened, a resistance connected in series with the shunt field of said dynamo, a second circuit for energizing said solenoid independently of said ampere hour meter, a short-circuiting circuit for said resistance, a common switch for opening and closing said second and short-circuiting circuits, a lever for said second clutch, an emergency brake lever, and means independently operated by said emergency brake lever and said clutch lever to first close said common switch, then disconnect said second clutch, or to connect said second clutch and then open said common switch, depending upon the direction of movement of said brake levers.

2. A motor driven vehicle comprising an internal combustion engine provided with a throttle, a throttle lever and an accelerator pedal for independently actuating said throttle, a compound wound dynamo, driving connections between said dynamo and said internal combustion engine, a multi-speed forward and reverse gear transmission connected with said dynamo by a clutch, a propeller shaft driven from said transmission, a service brake, an emergency brake, a storage battery, a circuit for connecting said dynamo and storage battery comprising a solenoid operated main switch and an ampere hour meter, an energizing circuit for the solenoid of said main switch, contacts controlled by said ampere hour meter to open and close said energizing circuit when said battery is discharged or charged respectively, a switch connected with said throttle lever to close said energizing circuit before the throttle is opened, a resistance connected in series with the shunt field of said dynamo, a second circuit for energizing said solenoid independently of said ampere hour meter, a short-circuiting circuit for said resistance, a common switch for opening and closing said second and short-circuiting circuits, a clutch lever, and means operated by said clutch lever to first close said common switch, then disconnect said clutch, or to connect said clutch and then open said common switch, depending upon the direction of movement of said brake lever.

3. A motor driven vehicle comprising an internal combustion engine provided with a throttle, a throttle lever and an accelerator pedal for independently actuating said throttle, a compound wound dynamo, driving connections between said dynamo and said internal combustion engine, a multi-speed forward and reverse gear transmission connected with said dynamo by a clutch, a propeller shaft driven from said transmission, a service brake, an emergency brake, a storage battery, a circuit for connecting said dynamo and storage battery comprising a solenoid operated main switch and an ampere hour meter, an energizing circuit for the solenoid of said main switch, contacts controlled by said ampere hour meter to open and close said energizing circuit when said battery is discharged or charged respectively, a switch connected with said throttle lever to close said energizing circuit before the throttle is opened, a resistance connected in series with the shunt field of said dynamo, a second circuit for energizing said solenoid independently of said ampere hour meter, a short-circuiting circuit for said resistance, a common switch for opening and closing said second and short-circuiting circuits, an emergency brake lever, and means operated by said emergency brake lever to first close said common switch, then disconnect said clutch, or to connect said clutch and then open said common switch, depending upon the direction of movement of said brake levers.

4. A motor driven vehicle comprising an internal combustion engine provided with a throttle, a throttle lever and an accelerator pedal for independently actuating said throttle, a compound wound dynamo, driving connections between said dynamo and said internal combustion engine, a multi-speed forward and reverse gear transmission connected with said dynamo by a clutch, a propeller shaft driven from said transmission, a brake mechanism, a storage battery, a circuit for connecting said dynamo and storage battery comprising a solenoid operated main switch and an ampere hour meter, an energizing circuit for the solenoid of said main switch including a manually operated switch and a switch controlled by said ampere hour meter, a resistance connected in series with the shunt field of said dynamo, a circuit for short-circuiting said resistance, a second circuit for energizing said solenoid comprising said resistance, and means connected with said brake mechanism for opening and closing said second and short-circuiting circuits.

5. A motor driven vehicle comprising an internal combustion engine provided with a throttle, a throttle lever and an accelerator pedal for independently actuating said throttle, a compound wound dynamo, driving connections between said dynamo and said internal combustion engine, a multi-speed forward and reverse gear transmission connected with said dynamo by a clutch, a propeller shaft driven from said transmission, a brake mechanism, a storage battery, a circuit for connecting said dynamo and storage battery comprising a solenoid operated main switch and an ampere hour meter, an energizing circuit for the solenoid of said main switch including a manually operated switch, and a switch controlled by said ampere hour meter, a circuit for energizing said solenoid, and means connected with said brake mechanism for opening and closing said circuit.

6. A motor driven vehicle comprising an internal combustion engine provided with a throttle, a throttle lever and an accelerator pedal for independently actuating said throttle, a compound wound dynamo, driving connections between said dynamo and said internal combustion engine, a multi-speed and reverse gear transmission connected with said dynamo by a clutch, a propeller shaft driven from said transmission, a brake mechanism, a storage battery, a circuit for connecting said dynamo and storage battery comprising a solenoid operated main switch and an ampere hour meter, an energizing circuit for the solenoid of said main switch including a manually operated switch and a switch controlled by said ampere hour meter, a resistance connected in series with the shunt field of said dynamo, a circuit for short-circuiting said resistance, and means connected with said brake mechanism for opening and closing said short-circuiting circuit.

7. A motor driven vehicle comprising an internal combustion engine provided with a throttle, a throttle lever and an accelerator pedal for independently actuating said throttle, a dynamo, driving connections between said dynamo and said engine, a propeller shaft having driving connection with said dynamo including a clutch, a storage battery, a circuit for connecting said dynamo and storage battery including a solenoid operated main switch and an ampere hour meter, an energizing circuit for the solenoid of said main switch including a manually operated switch and a switch controlled by said ampere hour meter, a second circuit for actuating said solenoid independently of said ampere hour meter, a switch in said second circuit, and means for successively closing said last named switch and disconnecting said clutch, or vice versa.

8. A motor driven vehicle comprising an internal combustion engine, a dynamo, driving connections between said dynamo and said engine, a propeller shaft having driving connection with said dynamo including a clutch, a storage battery, a circuit for connecting said dynamo and storage battery including a solenoid operated main switch and an ampere hour meter, an energizing circuit for the solenoid of said main switch including a manually operated switch and a switch controlled by said ampere hour meter, a second circuit for actuating said solenoid independently of said ampere hour meter, a switch in said second circuit, and means for successively closing said last named switch and disconnecting said clutch, or vice versa.

9. A motor driven vehicle, comprising an internal combustion engine, a dynamo, driving connections between said dynamo and said engine, a propeller shaft having driving connection with said dynamo including a clutch, a storage battery, a circuit for connecting said dynamo and storage battery including a solenoid operated main switch, an energizing circuit for the solenoid of said main switch including a manually operated switch, a second circuit for actuating said solenoid, a switch in said second circuit, and means for successively closing said last named switch and disconnecting said clutch, or vice versa.

10. A motor vehicle comprising an engine, a dynamo, driving connections between said engine and dynamo, a propeller shaft, driving connections between said dynamo and said propeller shaft comprising a clutch, a storage battery, a circuit for connecting said dynamo and storage battery including a solenoid operated switch, an energizing circuit for said solenoid comprising a switch, and means for successively closing said switch and disconnecting said clutch.

11. A motor vehicle comprising an engine, a dynamo having a shunt winding, driving connections between said engine and said dynamo, a storage battery, a circuit for connecting said dynamo and battery, a resistance in series with said shunt winding, a brake mechanism, and common means for successively short-circuiting said resistance and applying the brakes.

12. A motor vehicle comprising an internal combustion engine, a dynamo having a shunt winding, driving connections between said engine and dynamo, a storage battery, a circuit for connecting said dynamo and battery comprising a solenoid operated main switch, a circuit for energizing the solenoid of said main switch, automatic means for opening said energizing circuit when the battery is charged to the desired degree and for closing said circuit if the battery is discharged, and auxiliary means for closing said circuit independently of said automatic means.

13. A motor vehicle comprising an internal combustion engine, a dynamo having a shunt winding, driving connections between said engine and dynamo, a storage battery, a circuit for connecting said dynamo and battery comprising a solenoid operated main switch, a circuit for energizing the solenoid of said main switch, manual means for closing said circuit, and automatic means for holding said circuit closed as long as the battery is discharged.

In witness whereof I hereunto subscribe my name this 5th day of June, A. D. 1918.

LEIGH J. STEPHENSON.

Witnesses:
 MARY A. COOK,
 KATHLEEN W. HUTTON.